(12) United States Patent
Schweitzer et al.

(10) Patent No.: US 12,196,256 B2
(45) Date of Patent: Jan. 14, 2025

(54) MULTI-ROW ROLLING-ELEMENT BEARING

(71) Applicant: AKTIEBOLAGET SKF, Gothenburg (SE)

(72) Inventors: Ferdinand Schweitzer, St. Peter in der Au (AT); Rudolf Hauleitner, Ann Arbor, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 118 days.

(21) Appl. No.: 18/096,258

(22) Filed: Jan. 12, 2023

(65) Prior Publication Data
US 2023/0235781 A1 Jul. 27, 2023

(30) Foreign Application Priority Data
Jan. 21, 2022 (DE) .......................... 102022200671.2

(51) Int. Cl.
| | |
|---|---|
| *F16C 19/50* | (2006.01) |
| *F16C 19/08* | (2006.01) |
| *F16C 19/28* | (2006.01) |
| *F16C 33/38* | (2006.01) |
| *F16C 33/40* | (2006.01) |
| *F16C 33/46* | (2006.01) |

(Continued)

(52) U.S. Cl.
CPC .............. *F16C 19/28* (2013.01); *F16C 19/08* (2013.01); *F16C 19/505* (2013.01); *F16C 33/3862* (2013.01); *F16C 33/40* (2013.01); *F16C 33/4641* (2013.01); *F16C 33/48* (2013.01); *F16C 33/50* (2013.01); *F16C 2226/36* (2013.01)

(58) Field of Classification Search
CPC .............. F16C 19/08; F16C 19/18–388; F16C 33/3875; F16C 33/40; F16C 33/405; F16C 33/48; F16C 33/485; F16C 33/50; F16C 2226/36; F16C 2226/38
See application file for complete search history.

(56) References Cited

U.S. PATENT DOCUMENTS

| | | | | |
|---|---|---|---|---|
| 1,096,531 A | * | 5/1914 | Hess ........................ | F16C 33/42 384/523 |
| 1,146,271 A | * | 7/1915 | Mossig et al. ........ | F16C 33/585 384/511 |

(Continued)

FOREIGN PATENT DOCUMENTS

JP 2009144900 A * 7/2009 .......... F16C 33/3875

OTHER PUBLICATIONS

Machine Translation of JP 2009-144900 (Year: 2009).*

*Primary Examiner* — Alan B Waits
(74) *Attorney, Agent, or Firm* — J-TEK LAW PLLC; Scott T. Wakeman; Mark A. Ussai

(57) ABSTRACT

A multi-row rolling-element bearing includes first and second bearing rings and first and second rows of rolling elements therebetween. A cage between the first and second bearing rings has a first annular side part having a plurality of axially extending first bridge elements and a second annular side part having a plurality of axially extending second bridge elements connected to the first bridge elements to form bridges and to form pockets therebetween. At least one rolling element of the first row of rolling elements and at least one rolling element of the second row of rolling elements are located in each of the plurality of pockets.

12 Claims, 2 Drawing Sheets

(51) Int. Cl.
*F16C 33/48* (2006.01)
*F16C 33/50* (2006.01)

(56) References Cited

U.S. PATENT DOCUMENTS

| | | | | |
|---|---|---|---|---|
| 1,214,825 | A | * | 2/1917 | Richardson ............. F16C 33/40 |
| | | | | 384/534 |
| 1,467,063 | A | * | 9/1923 | Nelson .................... F16C 19/08 |
| | | | | 384/512 |
| 1,543,320 | A | * | 6/1925 | Cofrancesco ........... F16C 43/08 |
| | | | | 384/523 |
| 2,146,663 | A | * | 2/1939 | Vaughn .................... F16C 9/04 |
| | | | | 384/520 |
| 2011/0229068 | A1 | * | 9/2011 | Bohr .................. F16C 33/4652 |
| | | | | 384/572 |

* cited by examiner

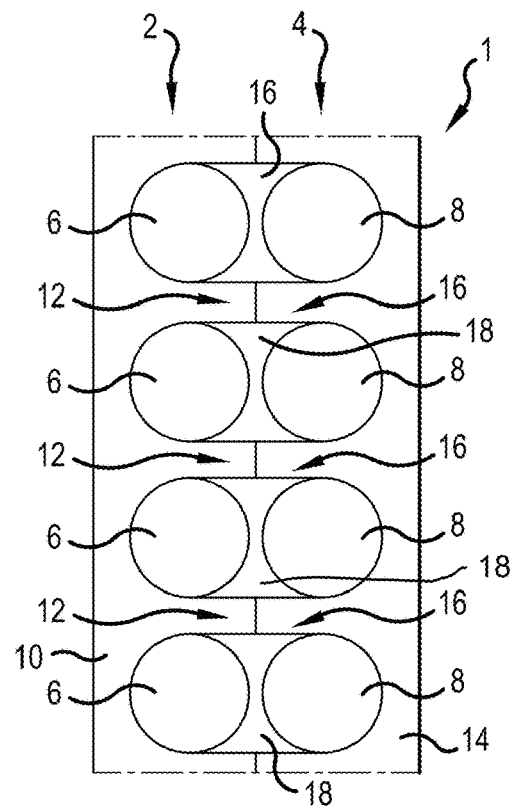
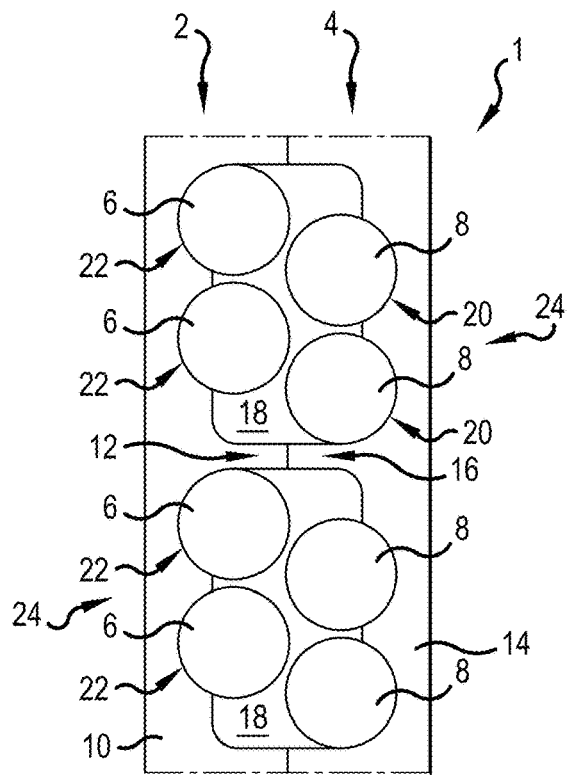
FIG.1 FIG.2
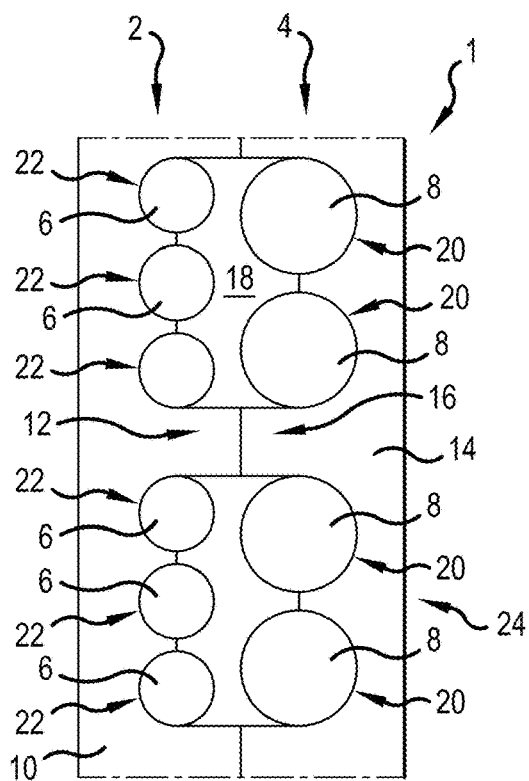
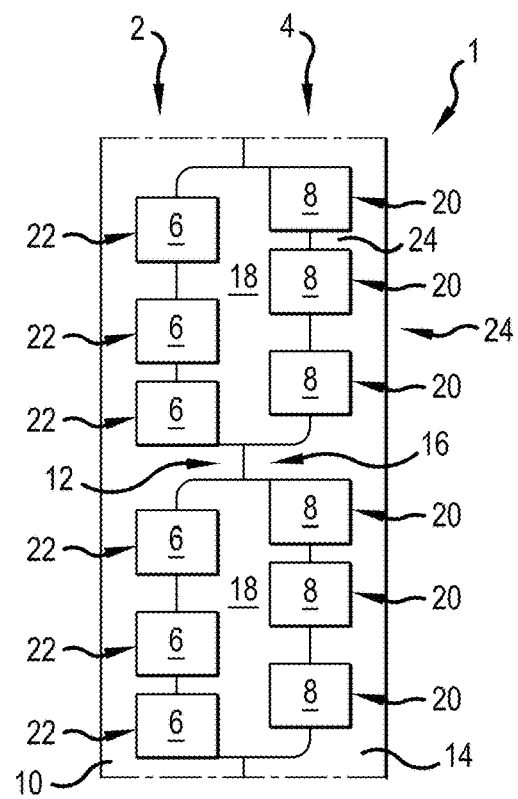
FIG.3 FIG.4

MULTI-ROW ROLLING-ELEMENT BEARING

CROSS-REFERENCE

This application claims priority to German patent application no. 10 2022 200 671.2 filed on Jan. 21, 2022, the contents of which are fully incorporated herein by reference.

TECHNOLOGICAL FIELD

The present disclosure is directed to a multi-row rolling-element bearing having a cage having pockets configured to receive rolling elements from two rows of rolling elements.

BACKGROUND

Due to the manner in which certain multi-row rolling-element bearings are installed and the presence of a plurality of multi-element rows, it is only possible to use a cage to guide and/or retain the rolling elements when the cage is snapped onto the rolling elements from outside after the rolling elements have been installed in the rolling-element bearing. For example, in the known Conrad assembly method, first the inner ring and the outer ring of the rolling-element bearing are installed, and the inner ring is radially offset relative to the outer ring. The rolling elements are then inserted into the empty region between the inner and outer ring, and finally the inner ring is guided back into the center of the bearing and the rolling elements are uniformly distributed between the inner and outer ring. At the end the cage is snapped on as required from outside.

It is disadvantageous here, among other things, that at higher rotational speeds these snap cages can jump out or misalign so that they are only suitable for applications with lower rotational speeds. Furthermore, this type of cage is not very strong and can generate vibrations that can disadvantageously affect the performance of the rolling-element bearing. In addition, due to their design and/or their material, snap cages can have a disadvantageous affect on lubrication of the rolling-element bearing.

SUMMARY

It is therefore an aspect of the present disclosure to provide a multi-row rolling-element bearing that can be used at higher rotational speeds than conventional snap bearings.

In the following a multi-row rolling-element bearing is described that includes a first bearing ring, a second bearing ring, at least two rows of rolling elements disposed between the first and second bearing rings, and a cage that includes a first side part with at least one first bridge element and a second side part with at least one second bridge element, the side parts being configured as separate elements and connected to each other in the region of the first and second bridge element. The rolling elements can be, for example, balls and/or rollers. The cage can preferably be manufactured from a suitable material, such as, for example, plastic, in particular polyamide, and/or metal, but also from wood and/or ceramic.

In order to be able to use the multi-row rolling-element bearing even at higher rotational speeds, at least one cage pocket is provided that is formed by the side parts together with the bridge elements, and the at least one cage pocket is configured to receive at least one rolling element of the first row and at least one rolling element of the second row. Since due to the common cage the at least two rolling-element rows have the same circumferential speed, the at least two rolling-element rows can advantageously be pushed together further in the axial direction until they even overlap in plan view. The axial installation space of the multi-row rolling-element bearing can thereby also be optimized if required.

For example, the first and the second side part can be connected to each other in an interference-fit, friction-fit, and/or material-bonded manner. Furthermore, at least one bearing ring, preferably both bearing rings, can be configured one-part so that a stability of the rolling-element bearing can be increased and/or vibration in the rolling-element bearing can be reduced. Furthermore, the strength of the cage can thereby also be increased.

According to a further embodiment, the first and the second side parts are releasably or captively connected to each other so that a jumping out and/or misalignment of the cage can advantageously be prevented even at high rotational speeds. The first and the second side parts are preferably adhered, riveted, welded, in particular welded with ultrasound, and/or connected by snap lugs.

Preferably the first row of rolling elements includes a first number of rolling elements and the second row of rolling elements includes a second number of rolling elements, the first number of rolling elements being different from the second number of rolling elements. In other words, the at least two rows of rolling elements can have a different number of rolling elements. The multi-row rolling-element bearing can thereby be more flexibly adapted to the application requirements.

Furthermore, the rolling elements of the first row can have a first size and the rolling elements of the second row can have a second size, and the first size is different from the second size. In other words, for example, the first row of rolling elements can have smaller rolling elements than the second row of rolling elements. This makes it possible to better adapt the rolling-element bearing to the load conditions acting on the rolling-element bearing.

According to a further embodiment, a plurality of rolling elements are received in a pocket per row. A load distribution in the multi-row rolling-element bearing can thereby advantageously be improved. The rolling elements of the first row can preferably be disposed in a pocket so that they are offset with respect to the rolling elements of the second row. The rolling elements of the first and the second row can thereby be prevented from interfering with each other. In addition—if necessary—the axial installation space of the multi-row rolling-element bearing can also thereby be optimized by the rolling-element rows being able to be pushed together in the axial direction. Furthermore, in one pocket the number of rolling elements of the first row can differ from the number of rolling elements of the second row.

Preferably at least one projection is provided in the pocket that is configured to space at least two rolling elements from each other. This makes it possible to provide a defined position of the rolling elements in the pocket.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 1 is a schematic view of a cage of a rolling-element bearing according to a first embodiment of the present disclosure.

FIG. 2 is a schematic view of a cage of a rolling-element bearing according to a second embodiment of the present disclosure.

FIG. 3 is a schematic view of a cage of a rolling-element bearing according to a third embodiment of the present disclosure.

FIG. 4 is a schematic view of a cage of a rolling-element bearing according to a fourth embodiment of the present disclosure.

DETAILED DESCRIPTION

Figure 5:
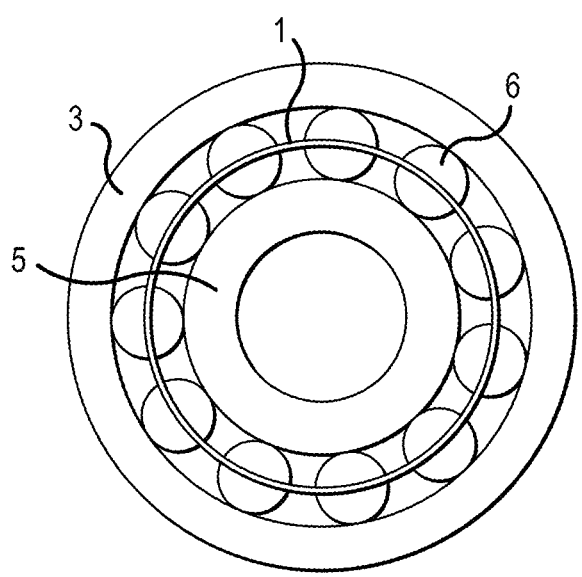
FIG. 5 is a schematic view of a rolling element bearing including the cage of FIG. 1.

In the following, identical or functionally equivalent elements are designated by the same reference numbers.

FIG. 1 shows a schematic view of a cage 1 of a rolling-element bearing according to a first embodiment. The rolling-element bearing shown in FIG. 1 is a double row rolling-element bearing and, as shown in FIG. 5, includes a first bearing ring 3, a second bearing ring 5, and two rows 2, 4 of rolling elements 6, 8 disposed between the first and second bearing ring 3, 5. The first and/or second bearing ring are preferably configured one-part.

The cage 1 has a first side part 10 that includes a plurality of first bridge elements 12 and a second side part 14 that includes a plurality of second bridge elements 16. The side parts 10, 14 are configured as separate elements and are connected to each other by the first and second bridge elements 12, 16. For example, the first and the second side part 10, 14 can be releasably or captively connected to each other. The connection of the first side part 10 to the second side part 14 can in particular take place in an interference-fit, friction-fit, and/or material-bonded manner. For example, the first and the second side part 10, 14 can be adhered, riveted, welded, in particular welded with ultrasound, to each other, and/or connected by snap lugs.

Together with the bridge elements 12, 16, the side parts 10, 14 form a plurality of pockets 18 that in FIG. 1 each receive a rolling element 6 of the first row 2 and a rolling element 8 of the second row 4. In FIG. 1, the rolling elements 6, 8 of the first and of the second row 2, 4 are balls. Preferably the first row 2 of rolling elements 6 includes a first number of rolling elements 6, and the second row 4 of rolling elements 8 includes a second number of rolling elements 8. In FIG. 1 the first row 2 of rolling elements 6 has the same number of rolling elements as the second row 4 of rolling elements 8.

FIG. 2 shows a cage 1 of a rolling-element bearing according to a second embodiment. The cage 1 of FIG. 2 differs from the cage 1 of FIG. 1 by the pocket 18 being configured to respectively receive two balls 6 of the first rolling-element row 2 and two balls 8 of the second rolling-element row 4.

Furthermore, in the region of the pocket 18, the first side part 10 and the second side part 14 are each provided with a projection 24 that is configured to space the two rolling elements 6 of the first row from each other, or to space the two rolling elements 8 of the second row from each other. The projection 24 forms in particular two recesses 20, 22 in the first side part 10 and/or in the second side part 14 that define the position of the rolling elements 6, 8 in the pocket 18 so that the rolling elements 6, 8, of the first and second rolling-element row 2, 4 are offset with respect to each other.

FIG. 3 shows a cage 1 of a rolling-element bearing according to a third embodiment. The cage 1 of FIG. 3 differs from the cage 1 of FIG. 2 by the rolling elements 6 of the first rolling-element row 2 having a smaller size than the rolling elements 8 of the second rolling-element row 4. Due to the different sizes of the rolling elements 6 of the first row 2 and the rolling elements 8 of the second row 4, the number of rolling elements 6 of the first row 2 also differs from the number of rolling elements 8 of the second row of rolling elements.

As can be seen in FIG. 3, the rolling elements of the first row 2 are smaller than the rolling elements 8 of the second row 4 of rolling elements. Furthermore, three balls of the first row 2 and two balls of the second row 4 are received in the pocket 18, the positions of which are defined by the projections 24 or the further recesses 20, 22.

FIG. 4 shows a cage 1 of a rolling-element bearing according to a fourth embodiment. The cage 1 of FIG. 4 differs from the cage 1 of FIG. 1 by the pocket 18 of the cage 1 of FIG. 4 being configured to respectively receive three rolling elements 6 of the first rolling-element row 2 and three rolling elements 8 of the second rolling-element row 4, the rolling elements in FIG. 4 are cylindrical rollers. Furthermore, in the region of the pocket 18, each side part 10, 14 is provided with two projections 24 that form three further recesses 20, 22, which are configured to define the position of the rolling elements 6, 8 in the pocket 18, so that the rolling elements 6, 8, the first and second rolling-element row 2, 4 are offset with respect to each other.

In summary, due to the fact that the cage pocket 18 is configured to receive at least one rolling element 6 of the first row 2 and at least one rolling element 8 of the second row 4, and the first and second side parts 10, 14 are connected to each other in an interference-fit, friction-fit, and/or material-bonded manner, the multi-row rolling-element bearing can be used even at high rotational speeds. Furthermore, a stability of the cage 1 and thus of the rolling-element bearing can thereby also be increased, and/or vibration in the rolling-element bearing can be reduced. Since due to the common cage 1 the at least two rolling-element rows 2, 4 have the same circumferential speed, the at least two rolling-element rows 2, 4 can advantageously be pushed together further in the axial direction until they even overlap in plan view. The axial installation space of the multi-row rolling-element bearing can thereby be optimized if required.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved multi-row rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage
2 First rolling-element row
3 First bearing ring
4 Second rolling-element row
Second bearing ring
6 Rolling element
8 Rolling element
First side part
12 First bridge element
14 Second side part
16 Second bridge element
18 Pocket
Further recess
22 Further recess
24 Projection

What is claimed is:
1. A multi-row rolling-element bearing comprising:
a first bearing ring,
a second bearing ring,
a first row of rolling elements disposed between the first bearing ring and the second bearing ring and a second row of rolling elements disposed between the first bearing ring and the second bearing ring, and
a cage including an first annular side part having a plurality of axially extending first bridge elements and a second annular side part having a plurality of axially extending second bridge elements,
wherein the plurality of first bridge elements are connected to the plurality of second bridge elements at a plurality of joints to form a plurality of bridges and a plurality of pockets, each of the plurality of pockets being defined by an adjacent pair of the bridges,
wherein at least one rolling element of the first row of rolling elements and at least one rolling element of the second row of rolling elements are located in each of the plurality of pockets, and
wherein each of the plurality of pockets includes a plurality of rolling elements of the first row of rolling elements and a plurality of rolling elements of the second row of rolling elements.
2. The rolling-element bearing according to claim 1, wherein the first side part is connected to the second side part by an adhesive or by rivets or by a weld or by snap lugs.
3. The rolling-element bearing according to claim 1, wherein the first side part is ultrasonically welded to the second side part.
4. The rolling-element bearing according to claim 1, wherein the first row of rolling elements includes a first number of rolling elements,
wherein the second row of rolling elements includes a second number of rolling elements different than the first number of rolling elements.
5. The rolling-element bearing according to claim 1, wherein the rolling elements of the first row of rolling elements have a first diameter, and the rolling elements of the second row have a second diameter different than the first diameter.
6. The rolling-element bearing according to claim 1, wherein in each pocket of the plurality of pockets the at least one rolling element of the first row of rolling elements is circumferentially offset from the at least one rolling element of the second row of rolling elements.
7. The rolling-element bearing according to claim 1, wherein each of the plurality of pockets includes a first rolling element of the first row of rolling elements and a second rolling element of the first row of rolling elements and a projection extending from the first side part to space the first rolling element of the first row of rolling elements from the second rolling element of the first row of rolling elements.
8. The rolling-element bearing according to claim 1, wherein the rolling elements are balls or rollers.
9. The rolling-element bearing according to claim 1, wherein the first bearing ring and the second bearing ring are configured as one-part.
10. The rolling-element bearing according to claim 1, wherein each of the plurality of pockets includes a first rolling element of the first row of rolling elements spaced from a second rolling element of the first row of rolling elements by a first projection and also includes a first rolling element of the second row of rolling elements spaced from a second rolling element of the second row of rolling elements by a second projection, and
wherein the first rolling element of the first row of rolling elements has a diameter greater than a diameter of the first rolling element of the second row of rolling elements.
11. The rolling-element bearing according to claim 10, wherein the first rolling element of the first row of rolling elements is circumferentially offset from the first and second rolling elements of the second row of rolling elements.
12. A multi-row rolling-element bearing comprising:
a first bearing ring,
a second bearing ring,
a first row of rolling elements disposed between the first bearing ring and the second bearing ring and a second row of rolling elements disposed between the first bearing ring and the second bearing ring, and
a cage including an first annular side part having a plurality of axially extending first bridge elements and a second annular side part having a plurality of axially extending second bridge elements,
wherein the plurality of first bridge elements are connected to the plurality of second bridge elements at a plurality of joints to form a plurality of bridges and a plurality of pockets, each of the plurality of pockets being defined by an adjacent pair of the bridges,
wherein at least one rolling element of the first row of rolling elements and at least one rolling element of the second row of rolling elements are located in each of the plurality of pockets, and
wherein in each pocket of the plurality of pockets a number of the rolling elements of the first row of rolling elements is different than a number of the rolling elements of the second row of rolling elements.

\* \* \* \* \*